United States Patent [19]

Baines

[11] E Patent Number: Re. 32,934

[45] Reissued Date of Patent: May 30, 1989

[54] FLEXIBLE BARRIER HOLDING AND MANIPULATING MECHANISM

[76] Inventor: Richard M. Baines, 51 Sentry Dr., SE., Cartersville, Ga. 30120

[21] Appl. No.: 63,683

[22] Filed: Jun. 19, 1987

Related U.S. Patent Documents

Reissue of:

[64] Patent No.: 4,553,739
Issued: Nov. 19, 1985
Appl. No.: 600,147
Filed: Apr. 13, 1984

U.S. Applications:

[63] Continuation-in-part of Ser. No. 463,340, Feb. 3, 1983.

[51] Int. Cl.[4] ..... A01G 17/06

[52] U.S. Cl. ..... 256/23; 256/1; 49/34; 24/69 T

[58] Field of Search ..... 256/23, 1; 49/34, 9; 160/328; 292/264, 247; 24/69 WT, 69 TT, 69 CT, 69 T, 70 CT, 68 CD, 68 CT

[56] References Cited

U.S. PATENT DOCUMENTS

| | | | |
|---|---|---|---|
| 1,643,297 | 9/1927 | Fitch et al. | 160/328 |
| 1,987,913 | 1/1935 | Schulz | 292/264 |
| 2,298,115 | 10/1942 | Felton et al. | 24/68 CT |
| 2,527,866 | 10/1950 | Welch | 292/264 X |
| 2,662,571 | 12/1953 | Kessler | 292/264 X |
| 2,919,895 | 1/1960 | Johnson | 24/68 CD |
| 3,893,724 | 7/1975 | Reinfeld | 292/247 |
| 4,174,119 | 11/1979 | Biles | 24/68 CD |
| 4,333,268 | 6/1982 | Dumbeck | 49/34 |

FOREIGN PATENT DOCUMENTS

| | | | |
|---|---|---|---|
| 192695 | 10/1957 | Austria | 24/69 T |
| 133593 | 10/1919 | United Kingdom | 292/247 |
| 558068 | 12/1943 | United Kingdom | 160/328 |

*Primary Examiner*—Andrew V. Kundrat
*Attorney, Agent, or Firm*—Hurt, Richardson, Garner, Todd & Cadenhead

[57] ABSTRACT

A flexible barrier element for a passageway defined by two spaced posts is held in a raised taut position to block the passageway by placement of a hand lever having a lost motion connection with the barrier element in a level position of engagement with a bracket fixed on one post. Swinging of the hand lever to a depressed position relative to the bracket on which it is pivotally mounted slackens the flexible barrier element and lowers it to a ground level position allowing unobstructed passage between the posts defining the passageway. A second bracket on the second post has a flexible barrier element attached to it.

9 Claims, 2 Drawing Sheets

FLEXIBLE BARRIER HOLDING AND MANIPULATING MECHANISM

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of prior co-pending application Ser. No. 06/463,340, filed Feb. 3, 1983, for BARRIER CHAIN MANIPULATING, POSITIONING, AND HOLDING SYSTEM.

BACKGROUND OF THE INVENTION

An objective of the present invention is to improve on the device disclosed in the prior application in terms of greater simplicity of construction and efficiency of operation, and better adaptability to posts of different types, such as cylindrical metal posts and rectangular wood posts.

As in the prior application, the invention is a simple device for manipulating a flexible barrier element, such as a chain or cable, in relationship to a passageway spanned by the barrier element. The device possesses the ability to place the barrier element in a raised taut position across the passageway to effectively block the passageway and to drop the barrier element to a slackened condition at ground level to allow unobstructed passage along the passageway. The device also has the ability to securely lock the barrier element in the elevated taut position. All of the manipulations of the flexible barrier element are accomplished without the necessity for disconnecting the barrier element from the manipulating lever of the device. They are also accomplished without the necessity for the user to handle the flexible barrier element at any time, as it is only necessary for the user to operate the pivoted hand lever.

A feature of the mechanism resides in its ability to hold the flexible barrier member in the raised taut position regardless of whether the mechanism is locked or unlocked. The hand lever will maintain the barrier element raised and taut merely by resting on the adjacent post mounted bracket with the hand lever and flexible barrier element in substantially a dead-center relationship.

Other features and advantages of the invention will become apparent during the course of the following detailed description.

DETAILED DESCRIPTION

Figure 1:
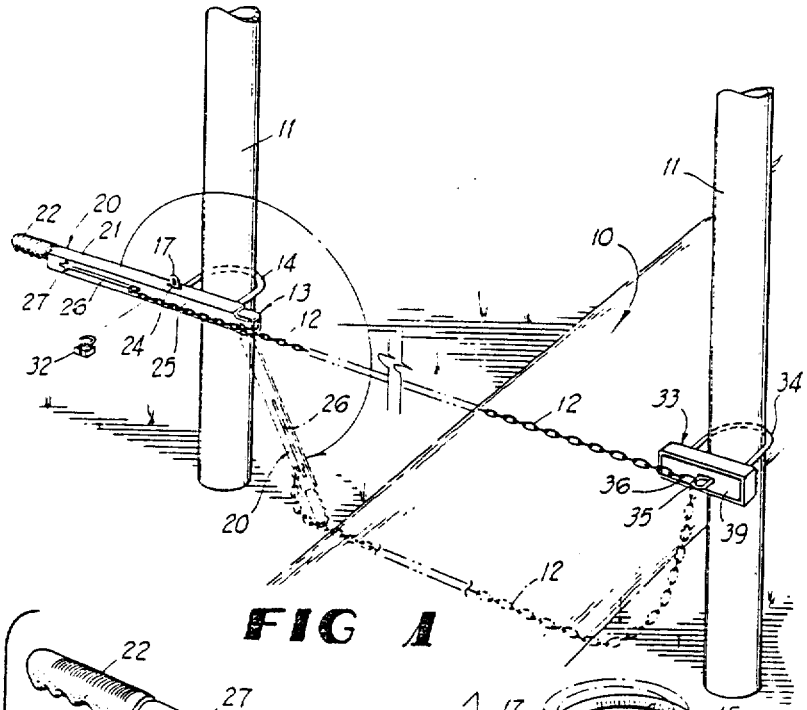
FIG. 1 is a perspective view of a flexible barrier holding and manipulating mechanism according to one embodiment of the invention.

Referring to the drawings in detail wherein like numerals designate like parts, a pedestrian or vehicular passageway 10 is defined in FIG. 1 by a pair of laterally spaced upright cylindrical metal posts 11. An adjustable flexible barrier element 12, such as a chain,is adapted when in a raised horizontal taut position to effectively block the passageway as shown in full lines in FIG. 1. When in a slackened and lowered position resting on the ground across the passageway 10, the latter is unobstructed and pedestrian or vehicular traffic can pass freely between the posts 11.

The subject matter of the invention comprises a simplified mechanism for manipulating the chain 12 or other flexible member, such as a cable, without the necessity of directly touching or handling the same. It should be understood that while a link chain has been shown in a preferred embodiment of the invention another type of flexible element, such as a steel cable, may also be utilized under the invention.

The mechanism comprises a first rectangular box-like mounting bracket 13 secured at a desired elevation on one post 11 by a sturdy U-bolt 14 which tightly embraces the rear side of the post and is preferably knurled on its interior as shown at 15 to prevent slippage of the U-bolt.

Figure 2:
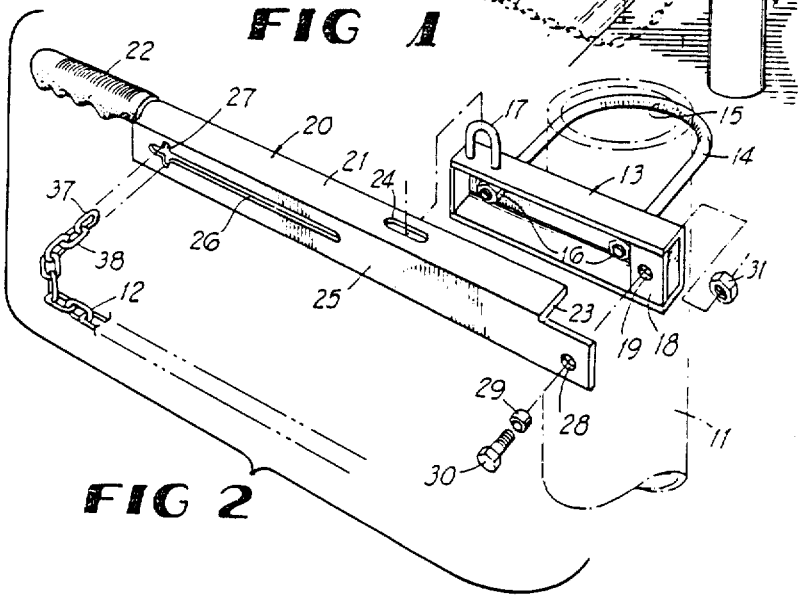
FIG. 2 is an exploded perspective view of a pivoted hand lever, mounting and locking bracket and associated elements shown in FIG. 1.

As best shown in FIG. 2, the U-bolt 14 is anchored to the back wall of bracket 13 by a pair of nuts 16 which are enclosed and protected within the box-like bracket 13. A locking loop 17 rises vertically from the top wall of the bracket 13 near one end thereof and is rigid with the top wall. A vertical plate 18 having an aperture 19 formed therethrough is connected between the top and bottom walls of the bracket 13 near its opposite end and forward side.

A manipulating hand lever 20 for the flexible barrier element 12 is L-shaped in cross section, being formed of a suitable length of angle bar. The top web 21 of the hand lever has an extension at one end of the lever on which a hand grip 22 is placed securely. The top web 21 is notched of foreshortened at its other end as shown at 23. Intermediate its length, the top web 21 of hand lever 20 has a longitudinal slot 24 formed therethrough of sufficient length to receive the locking loop 17 at proper times.

The vertical web 25 of hand lever 20 which perpendicular to the web 21 has a longitudinal slot 24 formed therethrough from a point near the longitudinal center of the hand lever to a point near its end adjacent to the hand grip 22. Near such end, a short perpendicular cross slot 27 intersects the longitudinal slot 26.

At its other end beyond the notch or edge 23, the vertical web 25 has an aperture 28 adapted for alignment coaxially with the aperture 19. The hand lever 20 is assembled with the bracket 13 by placing the top web 21 thereof on the top wall of the bracket with the locking loop 17 projecting through the slot 24 and the vertical web 25 overlying and essentially covering the forward open side of the box-like bracket 13. A wear-resisting bushing 29, is placed through the registering apertures 28 and 19 and the hand lever 20 is then pivotally connected to the bracket 13 by a pivot bolt 30 secured by a nut 31 which may be staked or permanently locked. In this manner, the hand lever 20 is freely pivotally connected to the bracket 13 for vertical swinging between the level lockable position shown in full lines in FIG. 1 and the depending steeply inclined flexible barrier release position shown in broken lines in the same figure of the drawings. The hand lever 20 will remain in the level position at rest on the bracket 13 without locking due to gravity. However, the hand lever 20 can be locked securely by a padlock 32 whose shackle is placed through the rigid locking loop 17 of the bracket at required times.

A second bracket 33 similar to the bracket 13 is fixed to the other post 11 by a U-bolt 34 identical to the U-bolt 14 and being secured to the back wall of the bracket 33 by enclosed nuts similar to the nuts 16. A rigid anchor loop 35 on the back wall of bracket 33 projects forwardly of the open side of the box-like bracket 33 and is attached to an end link 36 of barrier chain 12. The opposite end link 37 of the barrier chain is insertable through the short cross slot 27 of the hand lever 20 and the next adjacent chain link 38 can then be slid through the longitudinal slot 26 with the link 37 locked slidably behind the slot and behind the vertical web 25 to form a lost motion connection between the chain and pivoted hand lever.

In instances where a cable is employed as the flexible barrier, in lieu of a link chain, one end of the cable is suitably secured to the loop 35 and its other end is equipped with a slider which can engage the lost motion slot 26 in a manner similar to the engagement of the links 37 and 38 with this slot.

Preferably, the brackets 13 and 33 are installed at the same elevation on the two posts 11 to create a self-locking dead center relationship between the hand lever 20, chain 12 and loop 35 when the hand lever is in the level position resting on the bracket 13. The chain 12 can be finely adjusted relative to the hand lever 20 to provide a taut condition as shown in FIG. 1 by selecting the proper number of links near the free end of the chain to place through the slot 27.

When the hand lever 20 is unlocked and is swung on the axis of pivot bolt 30 to the down or release position shown in broken lines in FIG. 1, the chain will lie at ground level across the passageway so as not to interfere with pedestrain or vehicular traffic. The lost motion connection with the chain afforded by the slot 26 provides extra slack in the chain or other flexible element when the hand lever 20 is in the down position.

It should now be clear that all required manipulations of the flexible barrier are made by use of the hand lever 20 without the necessity of touching the actual barrier element with the hands. The barrier element is slackened, rendered taut while elevated and locked entirely by use of the hand lever.

The bracket 33 includes a front cover plate 39 which encloses and protects the nuts securing the U-bolt 34 to the bracket 33.

Figure 3:
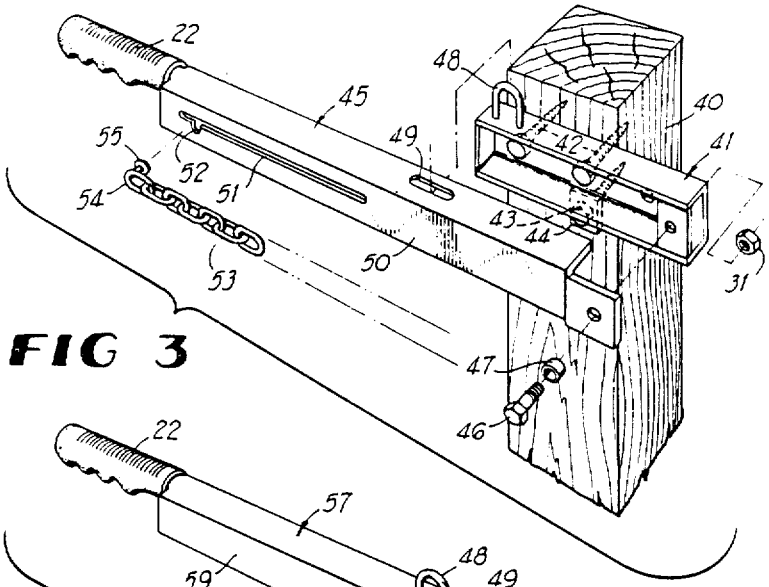
FIG. 3 is an exploded perspective view similar to FIG. 2 showing a second embodiment of the invention.

FIG. 3 shows an embodiment of the invention adapted for mounting on rectangular wooden posts 40, one such post being illustrated at one side of the passageway. Fixed to this post 40 is a bracket 41 similar to the bracket 13 but not being employed with a U-bolt. Instead, the back wall of the bracket 41 is secured to the front face of the post 40 by a pair of screws 42. Preferably, a third screw 43 anchors a depending apertured tab 44 on the bottom of the bracket 41 to the post.

A hand lever 45 similar to the hand lever 20 is pivoted by bolt 46 and wear sleeve 47 to the bracket 41 in the manner described previously in connection with the prior embodiment. The bracket 41 carries an upstanding locking loop 48 engageable within a slot 49 of hand lever 45 in the manner previously described. The vertical web 50 of hand lever 45 has a longitudinal slot 51 formed therethrough including a short lateral extension 52 near its outer end.

A chain barrier 53 on its endmost link 54 carries a headed slider 55 engageable into the slot 51 through its extension 52 to provide the previously-described lost motion connection.

A second mounting bracket, not shown, on a second wooden post 40 defining the passageway, is arranged generally as shown in the prior embodiment to complete the mechanism in FIG. 3, which operates in essentially the same manner described in the prior embodiment.

Figure 4:
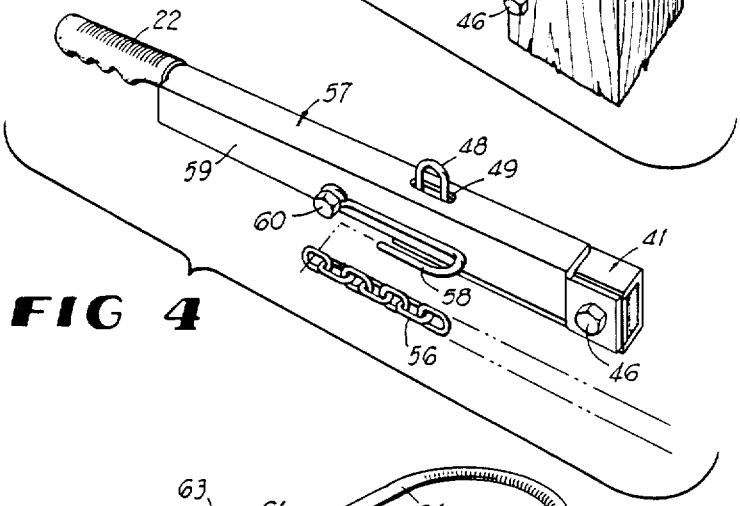
FIG. 4 is a fragmentary perspective view showing a variation in the lost motion connection between the pivoted hand lever and flexible barrier element.

FIG. 4 shows a variation in the lost motion connection between the barrier chain 56 and the pivoted hand lever 57. In other respects, the mechanism remains unchanged from FIG. 3.

The lost motion connection in FIG. 4 is achieved by securing an elongated hook 58 to the vertical web 59 of hand lever 57 by a fastener 60 which is staked or locked. A selected link of the chain 56 is engaged with the hook 58 to form the required lost motion connection as the pivoted hand lever is moved between the down chain slackening position to the level chain elevating and tightening position, as previously described. The hook 58 pivots on fastener 60. By the hook 58 pivoting, the chain stays on the hook. The hook stays in a down position toward the hand grip 22 until the handle is raised again.

Figure 5:
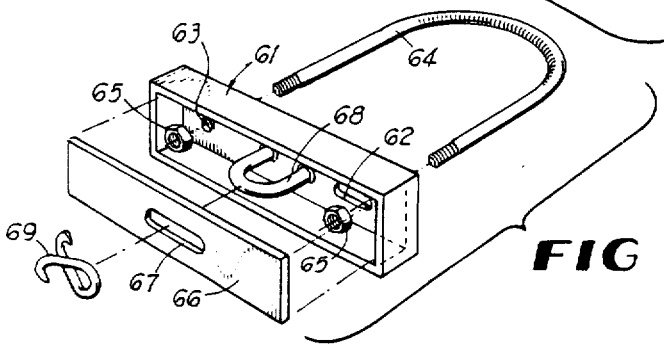
FIG. 5 is an exploded perspective view of a mounting bracket and associated elements in accordance with another variation of the invention.

FIG. 5 shows a variation in the mounting bracket 61 which anchors the chain or cable to the post remote from the pivoted handle, such as the bracket 33 in FIG. 1. The bracket 61 has a longitudinal slot 62 in its back wall and one circular aperture 63 in the same wall. This allows U-bolts 64 of various sizes to be utilized with the bracket 61 depending upon the diameter of the metal post which is used. The U-bolt 64 is secured by nuts 65 which are enclosed in the box-like bracket 61 by a front cover plate 66 having a center slot 67 receiving a fixed anchor loop 68 on the back wall of the bracket 61. The elements 66 and 68 correspond to the elements 39 and 35 in FIG. 1.

A link of the barrier chain can be slipped over the loop 68 following placement of the cover plate 66 and secured by a removable spring element 69. It can be seen that the open link 69 is inserted through fixed anchor loop 68 and the end of the barrier chain and then hammered closed. Another method is to use a lock which means the chain can easily be removed from the bracket 61.

It may be seen that in all embodiments of the invention, a pair of brackets is secured to two upright posts defining a passageway. A vertically swingable hand lever is pivotally attached to one bracket to rest thereon in a level chain elevating and tightening position. A lost motion connection is established between the chain or other flexible barrier element and the lever and the other end of the chain or other flexible barrier element is attached to the other bracket. When the hand lever is swung to a down position on its bracket, the chain or other flexible element is slackened and laid upon the surface of the passageway so as not to impede traffic along the passageway.

The chain doesn't have to be handled every time the chain is raised and lowered, and tension on the barrier never has to be adjusted again once desired length has been chosen. The barrier only has to be raised and lowered.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A mechanism for adjusting a flexible barrier element across a passageway defined by two spaced upstanding posts, said mechanism comprising a first bracket means secured to one post at an elevation above the lower end of such post, a second bracket means secured to the other post at substantially the same elevation and having a substantially level top face, a hand lever pivotally attached to the second bracket means on a horizontal pivot axis so that the hand lever can swing in a vertical arc, the hand lever being adapted in a substantially level position to rest on the second bracket means and in a second position to extend downwardly from the second bracket means, said hand lever comprising an angle bar section having a top web and a depending vertical side web, said top web engaging and resting on said top face of the second bracket means when the hand lever is in said level position, a flexible barrier element connected with the first bracket means, and a lost motion connection between the flexible barrier element and said hand lever said lost motion connection including a slot in said side web.

2. A mechanism as defined in claim 1, and a locking loop rising from the top face of the second bracket means, and a receiver slot for the locking loop formed in said top web whereby the hand lever may be locked to the second bracket means by a padlock while in the substantially level position.

3. A mechanism for adjusting a flexible barrier element across a passageway defined by two spaced upstanding posts, and mechanism comprising a first bracket means secured to one post at an elevation above the lower end of such post, a second bracket means secured to the other post at substantially the same elevation, said first and second bracket means each including a bracket body position, and a U-bolt adjustably secured to said body portion and adapted to embrace one of said posts, a hand lever pivotally attached to the second bracket means on a horizontal pivot axis so that the hand lever can swing in a vertical arc, the hand lever being adapted in a substantially level position to rest on the second bracket means and in a second position to extend downwardly from the second bracket means, a flexible barrier element connected with the first bracket means, and a lost motion connection between the flexible barrier element and said hand lever.

4. A mechanism as defined in claim 3, and each bracket body portion having a forward open side, a closure plate for the forward open side of the bracket body portion of the first bracket means, and the forward open side of the bracket body portion of the second bracket means being closed by a vertical web of said hand lever when said hand lever is in said substantially level position.

5. A mechanism for adjusting a flexible barrier element across a passageway defined by two spaced upstanding posts, said mechanism comprising a first bracket means secured to one post at an elevation above the lower end of such post, a second bracket means secured to the other post at substantially the same elevation having a substantially level top face, a hand lever pivotally attached to the second bracket means on a horizontal pivot axis so that the hand lever can swing in a vertical arc, the hand lever being adapted in a substantially level position to rest on the second bracket means and in a second position to extend downwardly from the second bracket means, said hand lever comprising an angle bar section having a top web and a depending vertical side web, said top web engaging and resting on said top face of the second bracket means when the hand lever is in said level position, a flexible barrier element connected with the first bracket means, and a hook movably mounted on the hand lever and being engageable with the flexible barrier element to form a connection between the flexible barrier element and said hand lever.

*6. In a mechanism for adjusting a flexible barrier element across a passageway defined by a fixed element on each side of said passageway, the improvement comprising a bracket means having a body portion with fastening means for securing said bracket means to one of said fixed elements and a lock receiving loop means secured to said body position, a hand lever pivotally attached to said bracket means on a horizontal pivot axis so that the hand lever can swing in a vertical arc, the hand lever being adapted in a substantially level position to rest on said bracket member and including means to engage said lock receiving means for preventing movement of said lever upon insertion of a lock therein, and in a second position to extend downwardly therefrom, a flexible barrier element in secured relationship with the other of said fixed elements, and a lost motion connection between said flexible barrier element and said hand lever.*

*7. In a mechanism for adjusting flexible barrier element across a passageway defined by a fixed element on each side of said passageway, the improvement comprising a bracket means secured to one of said fixed elements and having a substantially level top face, a hand lever pivotally attached to said bracket means on a horizontal pivot axis so that the hand lever can swing in a vertical arc, the hand lever being adapted in a substantially level position to rest on said bracket means and in a second position to extend downwardly from said bracket means, said hand lever comprising an angle bar section having a top web and a depending vertical side web, said top web engaging and resting on said top face of said bracket means when the hand lever is in said level position, a flexible barrier element connected with the other of said fixed elements, and a lost motion connection between the flexible barrier element and said hand lever, said lost motion connection including a slot in said side web.*

*8. In a mechanism for adjusting a flexible barrier element across a passageway defined by a fixed element on both sides of said passageway, the improvement comprising a bracket means secured to one of said fixed elements and having a substantially level top face, a hand lever pivotally attached to the said bracket means on a horizontal pivot axis so that the hand lever can swing in a vertical arc, the hand lever being adapted in a substantially level position to rest on said bracket means and in a second position to extend downwardly from said bracket means, said hand lever comprising an angle bar section having a top web and a depending vertical side web, said top web engaging and resting on said top face of said bracket means when the hand lever is in said substantially level position, a flexible barrier element connected with the other of said fixed elements and a hook movably mounted on the hand lever and being engageable with the flexible barrier element to form a connection between the flexible barrier element and said hand lever.*

*9. In a mechanism for adjusting a flexible barrier element across a passageway defined by a fixed element on each side of said passageway, the improvement comprising a bracket means having a body portion with a forward open side, a fastening means adjustably secured to said body portion and adapted to secure said bracket means to one of said fixed elements, a hand lever pivotally attached to said bracket means on a horizontal pivot axis so that the hand lever can swing in a vertical arc, the hand lever being adapted in a substantially level position to rest on said bracket member and cover said forward open side of said body portion, and in a second position to extend downwardly therefrom, a flexible barrier element in secured relationship with the other of said fixed elements, and a lost motion connection between said flexible barrier element and said hand lever.*

* * * * *